United States Patent
Towne et al.

(10) Patent No.: US 8,069,609 B1
(45) Date of Patent: Dec. 6, 2011

(54) FLORAL ARRANGEMENT ASSEMBLY

(76) Inventors: Larry A. Towne, Mandan, ND (US);
Rebecca L. Towne, Mandan, ND (US)

( * ) Notice: Subject to any disclaimer, the term of this patent is extended or adjusted under 35 U.S.C. 154(b) by 289 days.

(21) Appl. No.: 12/561,299

(22) Filed: Sep. 17, 2009

(51) Int. Cl.
*A01G 5/00* (2006.01)
(52) U.S. Cl. .............. 47/41.12; 47/41.01; 206/423
(58) Field of Classification Search ............... 47/41.01, 47/41.12, 41.13, 41.15; 206/423
See application file for complete search history.

(56) References Cited

U.S. PATENT DOCUMENTS

| | | | | |
|---|---|---|---|---|
| 1,579,305 A * | 4/1926 | Goldberg | | 362/101 |
| 1,624,407 A * | 4/1927 | Hamilton | | 47/41.11 |
| 1,828,295 A * | 10/1931 | Roy | | 47/41.11 |
| 1,951,777 A * | 3/1934 | Siegler et al. | | 47/41.01 |
| D145,868 S | 11/1946 | Fletcher | | |
| 3,158,524 A * | 11/1964 | Duncan Tong | | 206/423 |
| 3,169,897 A * | 2/1965 | Kwong Tak Yue | | 428/27 |
| 3,259,236 A * | 7/1966 | Cole | | 206/423 |
| 3,768,202 A | 10/1973 | Wheelock | | |
| 4,461,118 A | 7/1984 | Fertig | | |
| D297,823 S | 9/1988 | Littlefield | | |
| 4,937,109 A | 6/1990 | Lin | | |
| 4,958,461 A * | 9/1990 | Aldrich | | 47/41.01 |
| 5,244,700 A * | 9/1993 | Banschick | | 428/4 |
| D348,415 S | 7/1994 | Domurat | | |
| 5,683,762 A * | 11/1997 | Banschick | | 428/4 |
| D529,308 S | 10/2006 | Reese | | |
| D598,322 S * | 8/2009 | Kunz | | D11/147 |
| 2005/0204618 A1* | 9/2005 | Cardamone et al. | | 47/41.13 |

OTHER PUBLICATIONS

Wanderfuls, Centerpieces and Favors Combo in one Simple Purchase, <retrieved from http://www.wanderfuls.com>, 2 pages, Sep. 10, 2009.

* cited by examiner

*Primary Examiner* — Frank T Palo
(74) *Attorney, Agent, or Firm* — Neustel Law Offices

(57) ABSTRACT

A floral arrangement assembly for efficiently creating a customizable arrangement of flowers and vases. The floral arrangement assembly generally includes a base unit having a plurality of receptacles, a plurality of tubular members removably positioned within the plurality of receptacles, a plurality of vessels positioned within the plurality of tubular members, and a plurality of retainers for securing the plurality of vessels to the plurality of tubular members. The tubular members and vessels are retained in a substantially upright position. The vessels are adapted to receive and retain a plurality of decorative flowers. The assembly may also be used without the base unit in one embodiment or without the vessels and retainers in another embodiment. The tubular members may additionally hold a plurality of decorative objects below the vessels for added décor. Further, a light may be positioned below the tubular members within the base unit for illuminating the assembly.

15 Claims, 10 Drawing Sheets

FLORAL ARRANGEMENT ASSEMBLY

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to flower vases and more specifically it relates to a floral arrangement assembly for efficiently creating a customizable arrangement of flowers and vases.

2. Description of the Related Art

Any discussion of the related art throughout the specification should in no way be considered as an admission that such related art is widely known or forms part of common general knowledge in the field.

It is well known that flowers are often cut along the stem and put within a decorative vase for everyday décor, birthdays, gifts, or other holidays and occasions. However, when arranging a plurality of bunches of flowers for purchase, the flowers often appear cluttered, non-memorable, or not as elegant as could otherwise be presented. Also, when displaying flowers, a centerpiece or vase for holding the flowers can often lack a feeling of elegance or beauty. Because of the inherent problems with the related art, there is a need for a new and improved floral arrangement assembly for efficiently creating a customizable arrangement of flowers and vases.

BRIEF SUMMARY OF THE INVENTION

A system for efficiently creating a customizable arrangement of flowers and vases. The invention generally relates to a flower and vase assembly which includes a base unit having a plurality of receptacles, a plurality of tubular members removably positioned within the plurality of receptacles, a plurality of vessels positioned within the plurality of tubular members, and a plurality of retainers for securing the plurality of vessels to the plurality of tubular members. The tubular members and vessels are retained in a substantially upright position. The vessels are adapted to receive and retain a plurality of decorative flowers. The assembly may also be used without the base unit in one embodiment or without the vessels and retainers in another embodiment. The tubular members may additionally hold a plurality of decorative objects below the vessels for added décor. Further, a light may be positioned below the tubular members within the base unit for illuminating the assembly.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
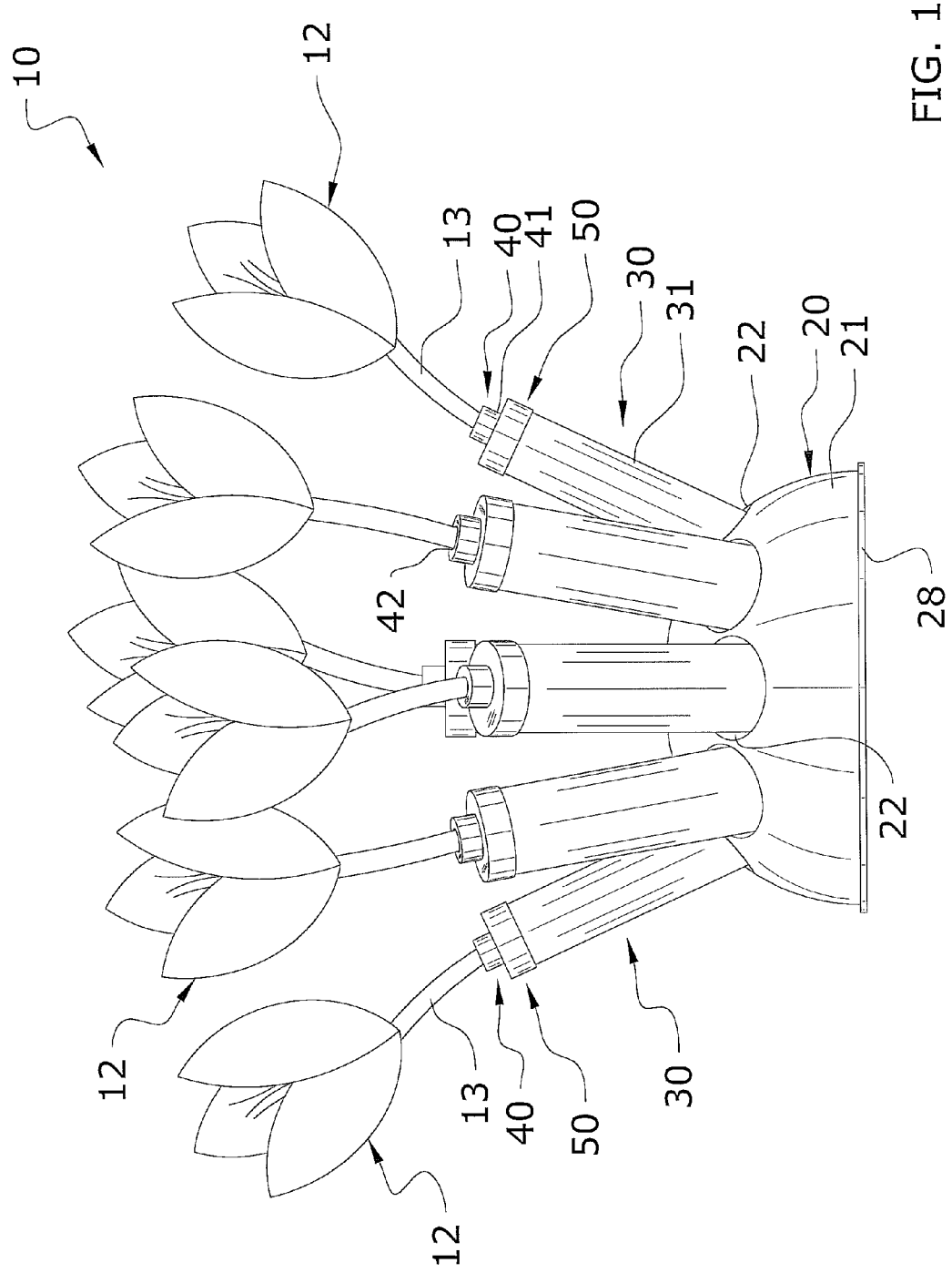
FIG. 1 is an upper perspective view of a first embodiment of the present invention in use.
Figure 2:
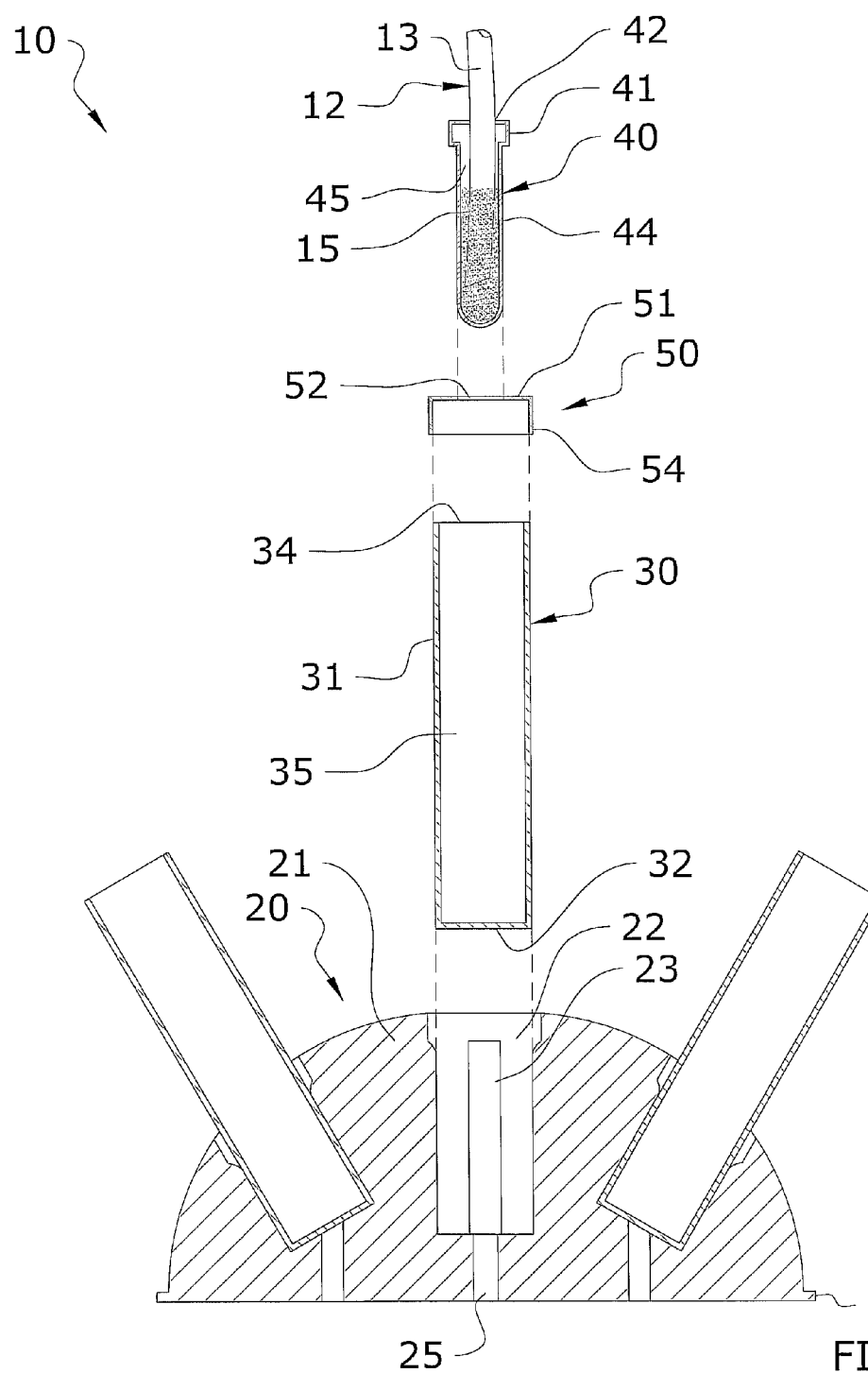
FIG. 2 is an exploded side sectional view of the first embodiment.
Figure 3:
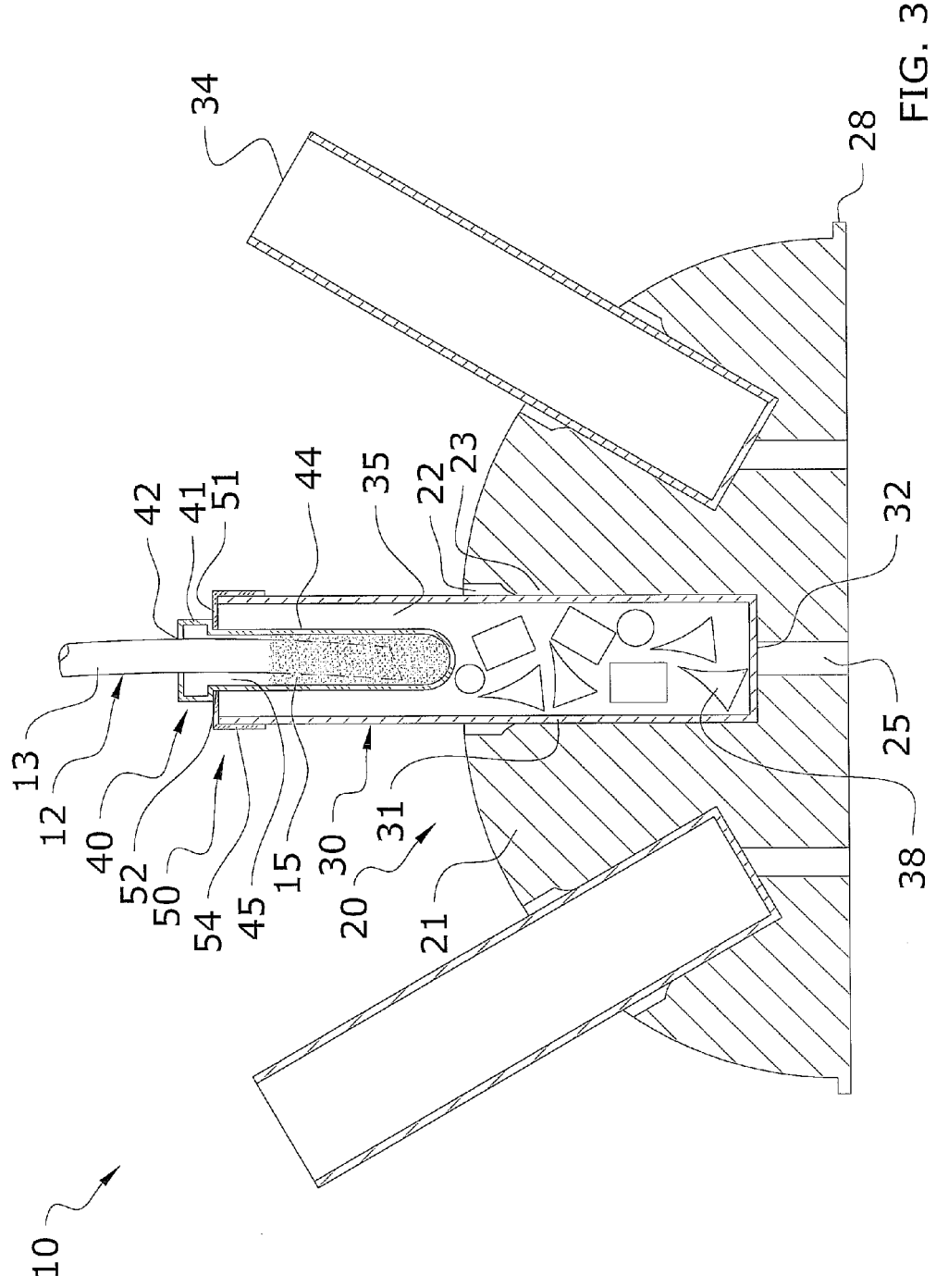
FIG. 3 is a side sectional view of the first embodiment illustrating a plurality of decorative objects.
Figure 4:
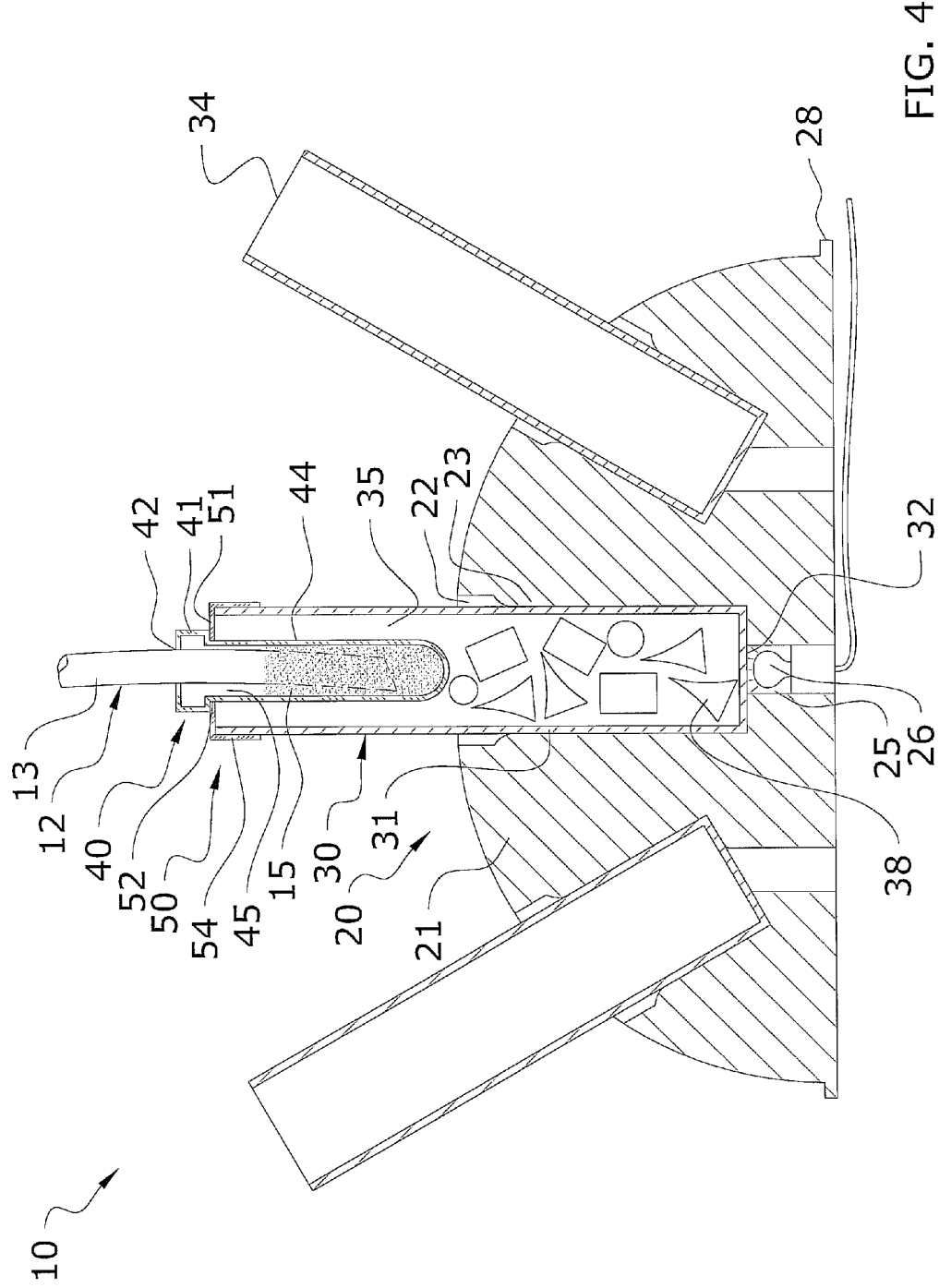
FIG. 4 is a side sectional view of the first embodiment illustrating a light.
Figure 5:
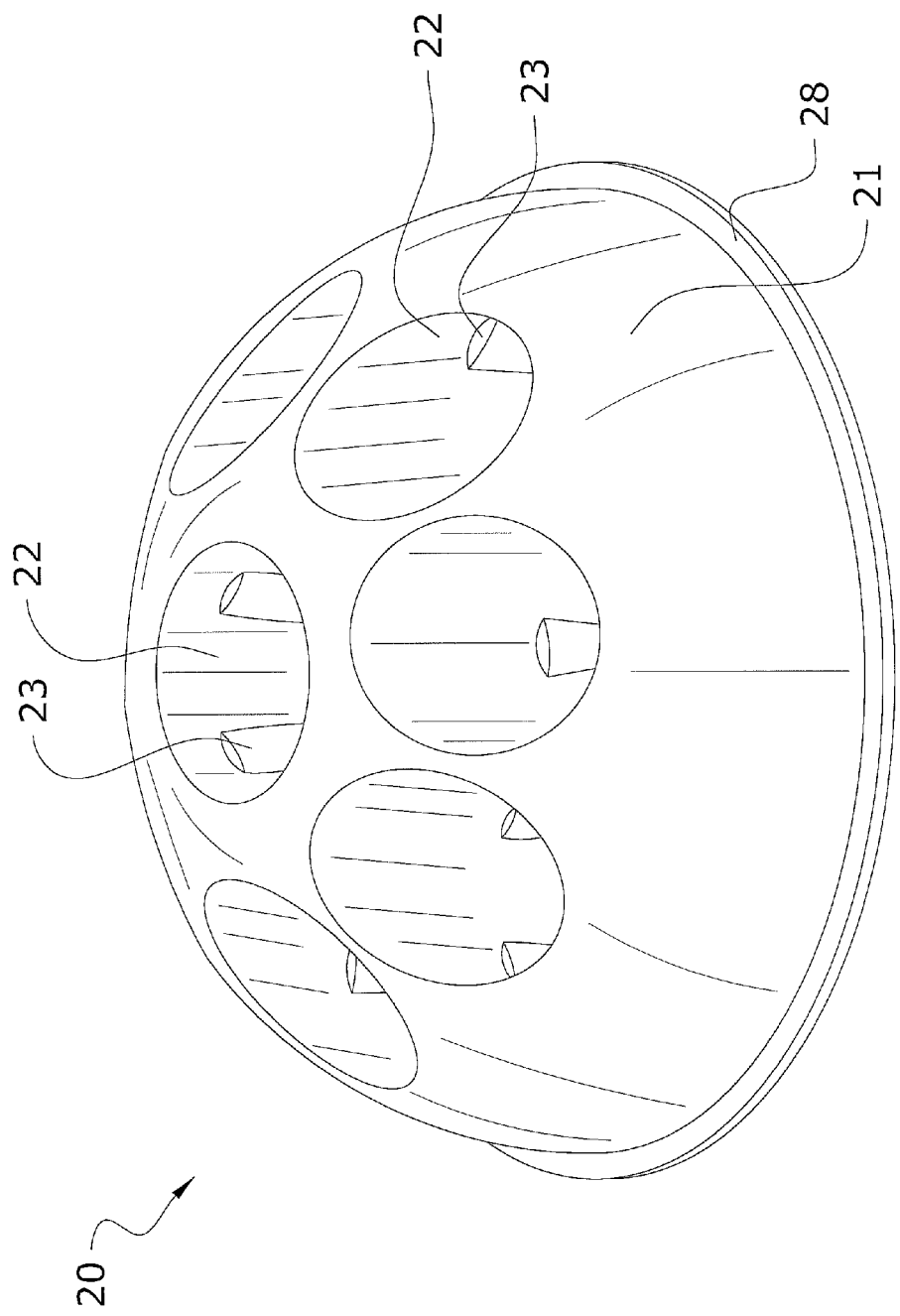
FIG. 5 is an upper perspective view of the base unit.
Figure 6:
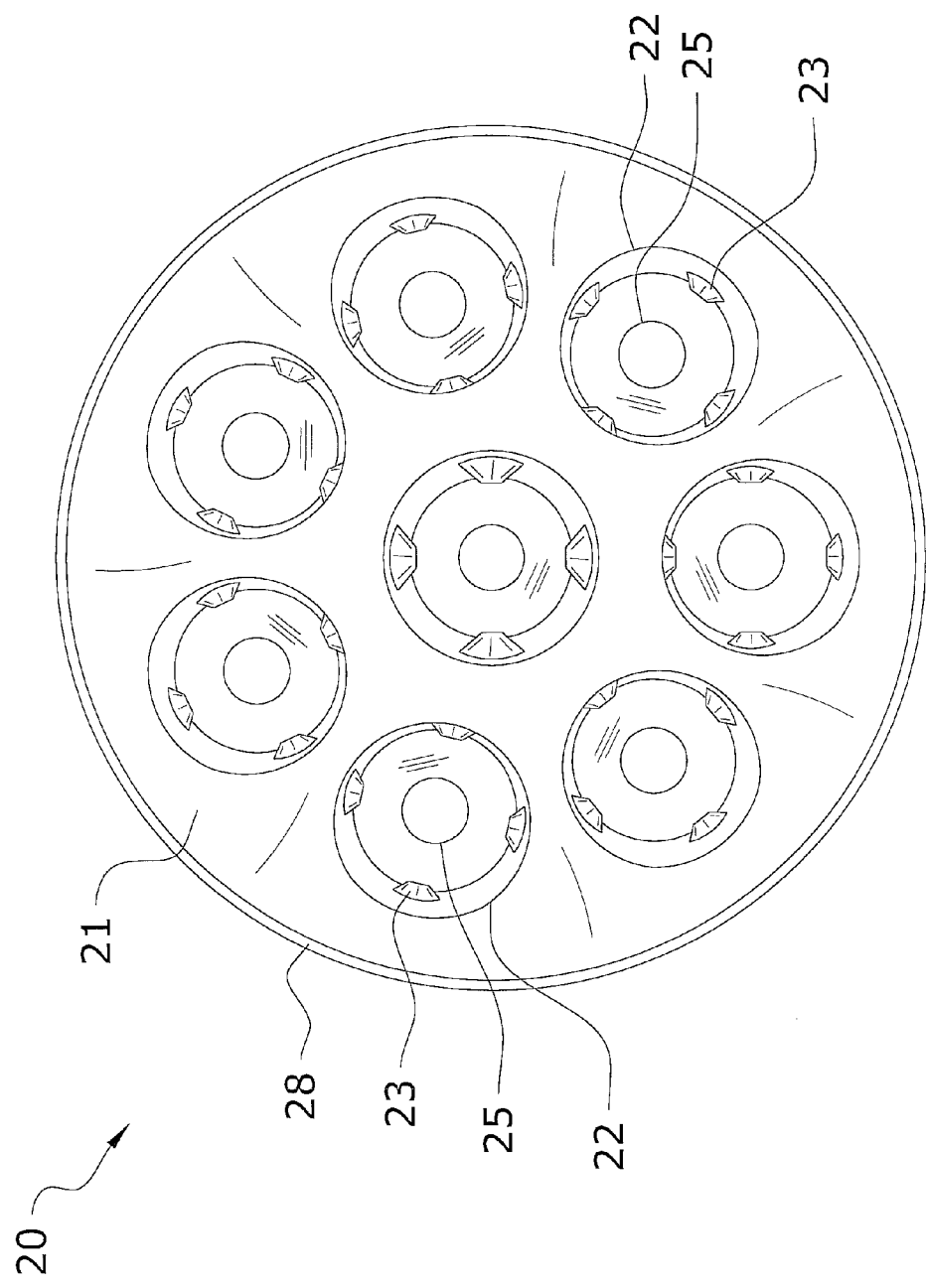
FIG. 6 is a top view of the base unit.
Figure 7:
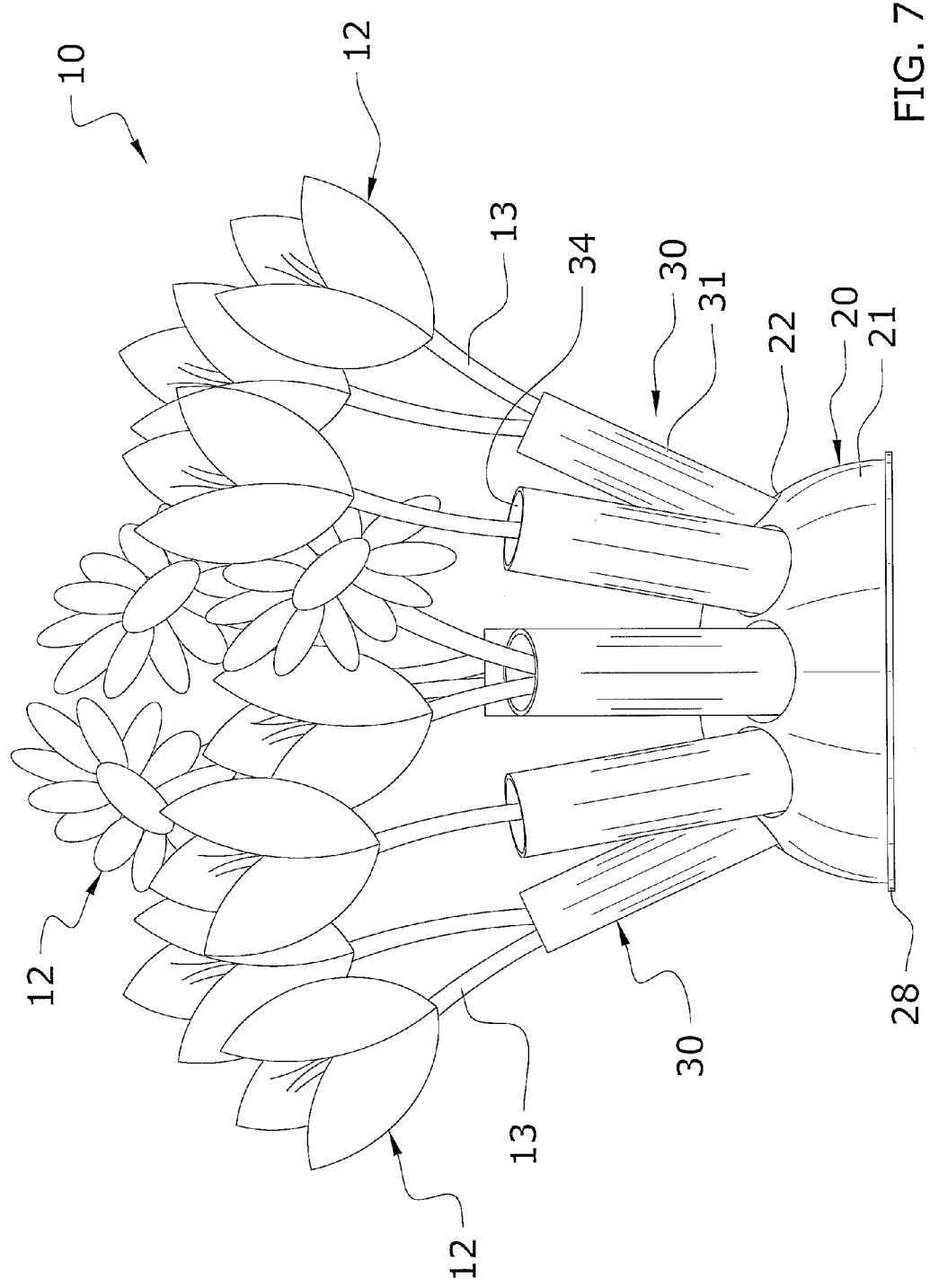
FIG. 7 is an upper perspective view of a second embodiment of the present invention in use.
Figure 8:
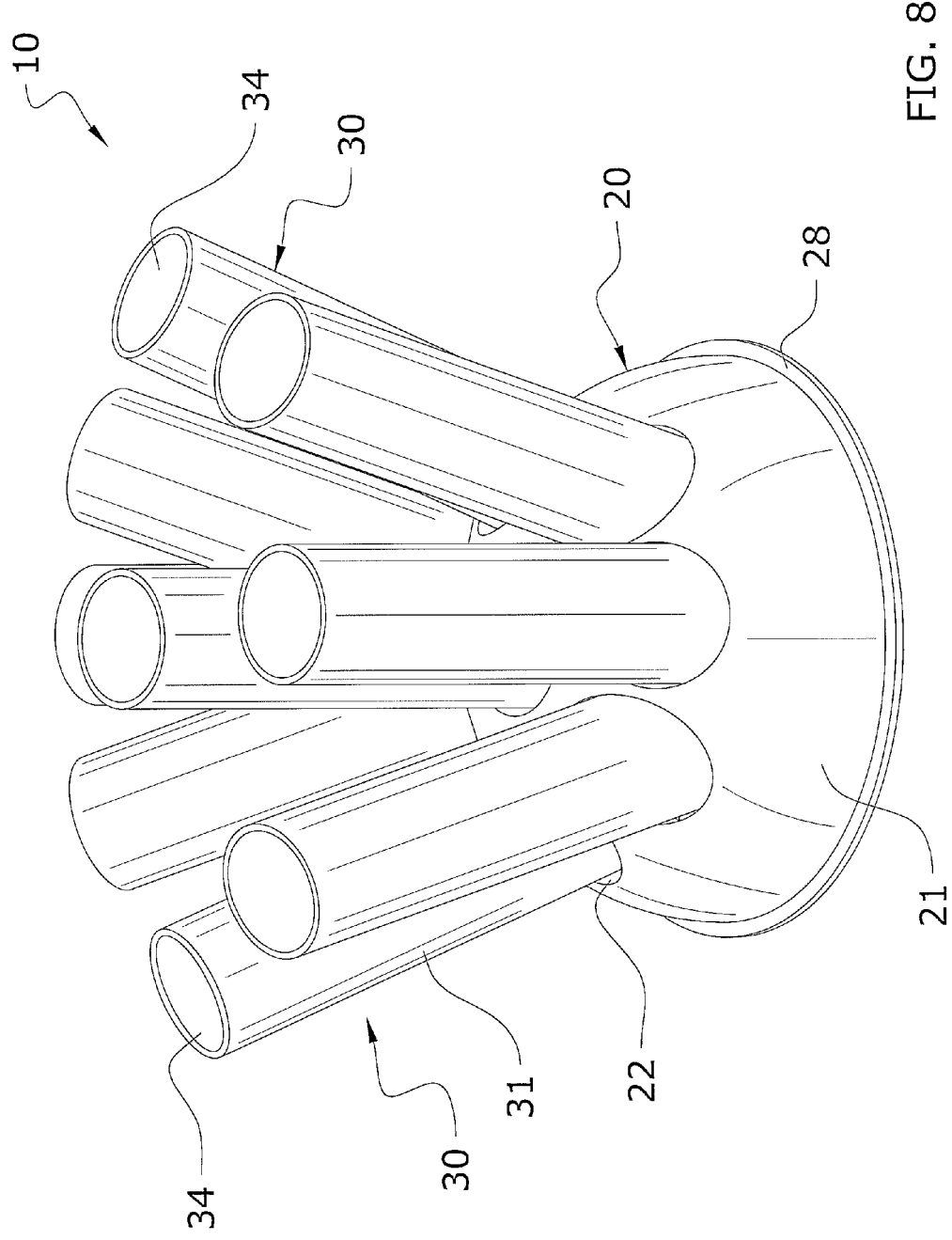
FIG. 8 is an upper perspective view of a second embodiment of the present invention without the flowers.
Figure 9:
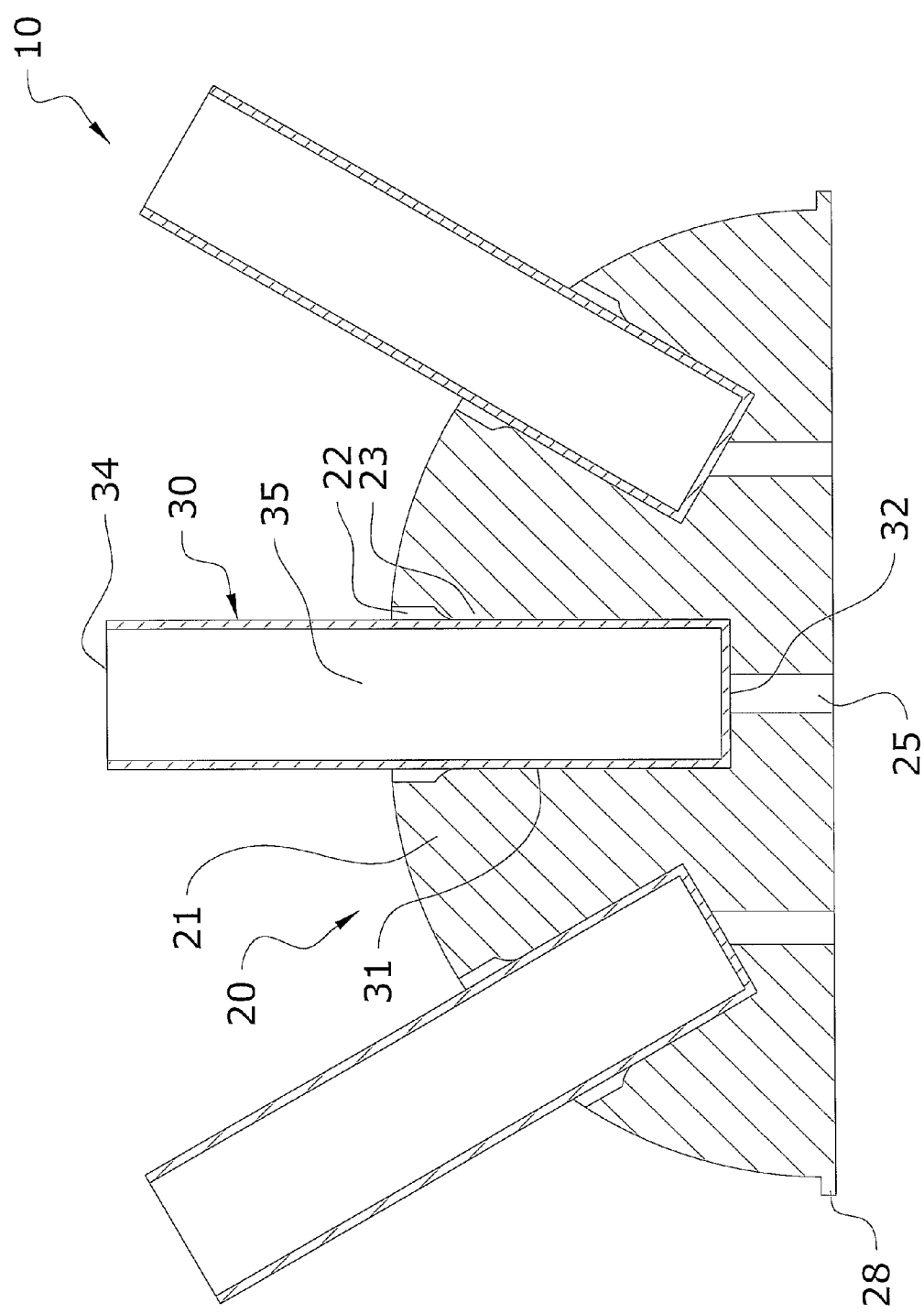
FIG. 9 is a side sectional view of the second embodiment.
Figure 10:
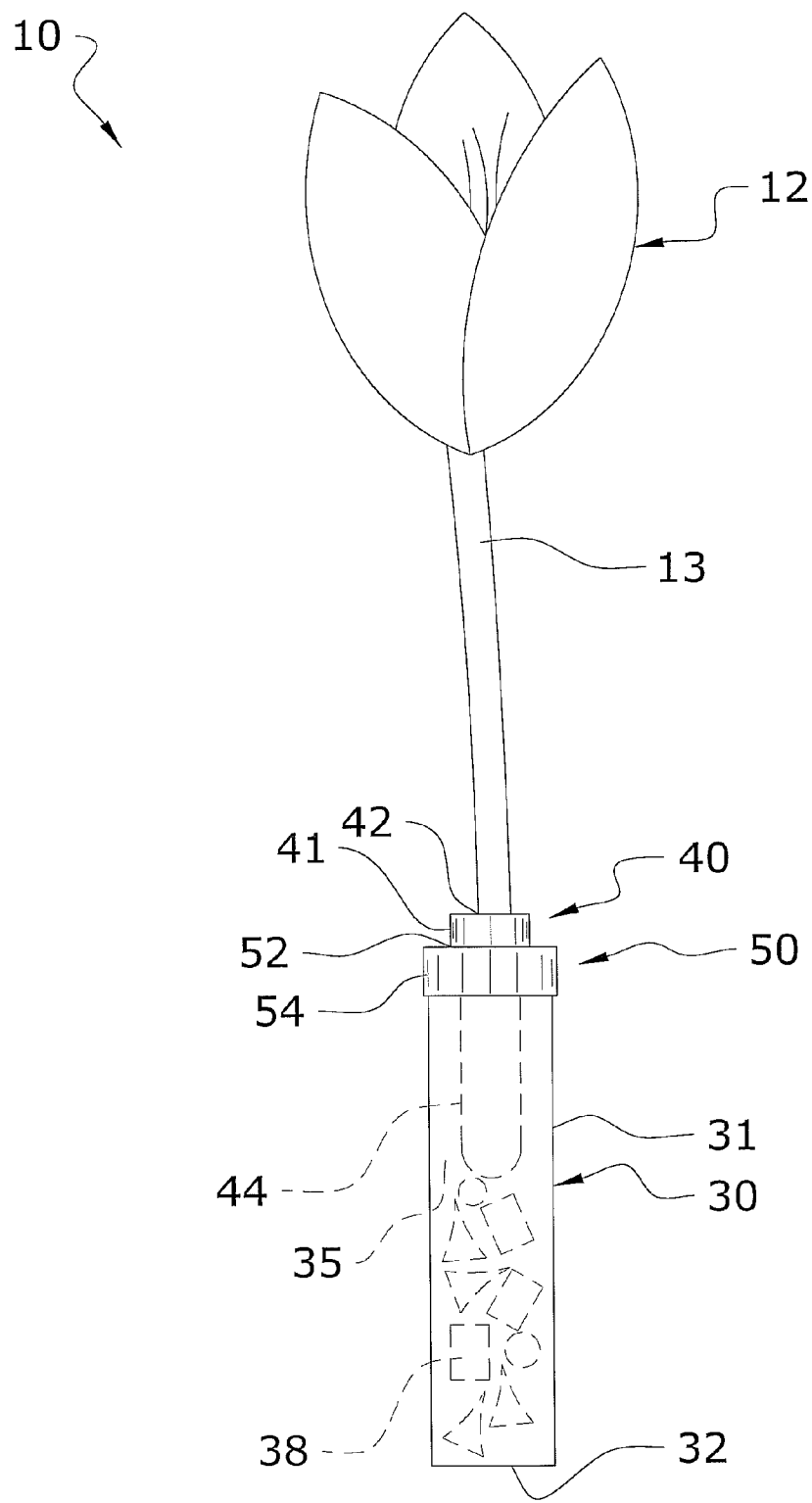
FIG. 10 is a side view of a third embodiment of the present invention.

Turning now descriptively to the drawings, in which similar reference characters denote similar elements throughout the several views, FIGS. 1 through 10 illustrate a floral arrangement assembly 10, which comprises a base unit 20 having a plurality of receptacles 22, a plurality of tubular members 30 removably positioned within the plurality of receptacles 22, a plurality of vessels 40 positioned within the plurality of tubular members 30, and a plurality of retainers for securing the plurality of vessels 40 to the plurality of tubular members 30. The tubular members 30 and vessels 40 are retained in a substantially upright position. The vessels 40 are adapted to receive and retain a plurality of decorative flowers 12.

The assembly may also be used without the base unit 20 in one embodiment or without the vessels 40 and retainers in another embodiment. The tubular members 30 may additionally hold a plurality of decorative objects 38 below the vessels 40 for added décor. Further, a light 26 may be positioned below the tubular members 30 within the base unit 20 for illuminating the assembly. Various types of decorative flowers 12 may be used, such as but not limited to live flowers, artificial flowers, ribbon, or various other decorations.

B. Base Unit.

The base unit 20 is used to support the assembly 10 upon a supporting surface, such as a table, etc. The base unit 20 may be comprised of various materials, all which generally provide a stable and substantially rigid structure for holding the tubular members 30 and flowers 12 within. The base unit 20 is also generally solid in structure; however hollow embodiments may be appreciated.

In the preferred embodiment, the body 21 of the base unit 20 is comprised of dome-shaped structure as illustrated. The body 21 also includes a bottom lip 28 protruding laterally outwards from a circumference of the bottom 32 of the body 21 for adding further stability to the assembly 10.

The body 21 also generally includes a plurality of receptacles 22 formed within the body 21 and extending within so that the upper end of the receptacles 22 is flush with the exterior round surface of the body 21. The receptacles 22 may be integral with the body 21 or may be comprised of separate components. The receptacles 22 are preferably cylindrical in shape to receive the lower end of the tubular members 30. In one arrangement, the receptacles 22 are arranged in a substantially circular pattern upon the body 21. Other arrangements of the receptacles 22 may be appreciated as well.

Each of the receptacles 22 also preferably includes a plurality of elongated grip members 23 protruding internally within the receptacles 22 for narrowing the diameter of the receptacles 22 to tightly receive the tubular members 30. The grip members 23 generally follow a longitudinal axis of the receptacles 22 and are spaced apart along the circumference of the receptacles 22. The grip members 23 may be comprised of various materials, such as rubber, plastic, or foam.

A plurality of lower openings 25 also preferably extend within the base unit 20 below each of the receptacles 22. Each of the lower openings 25 are visible from within the receptacles 22, wherein the lower openings 25 may be separated by clear plastic or may be fluidly connected to the receptacles 22. The lower openings 25 generally extend in a vertical manner below the receptacles 22 and through the bottom 32 of the base unit 20.

In an embodiment of the assembly 10, a light 26 is positioned within each of the lower openings 25 for illuminating the receptacles 22 and tubular members 30 within the receptacles 22. The light 26 thus illuminates the tubular members 30 and anything within the tubular members 30, such as the decorative objects 38, vessels 40, or flowers 12. Various types or colors of lights 26 may be used as is appreciated.

C. Tubular Member.

The tubular members 30 are each removably positioned within a respective receptacle 22 of the base unit 20, wherein one receptacle 22 generally receives one tubular member 30. The tubular members 30 are generally comprised of a clear plastic or glass material so as to view within, however other materials and colors may be appreciated. In some embodiments, the cut flowers 12 may be placed directly within the tubular members 30. In other embodiments, the flowers 12 may be placed directly within the vessels 40 which are subsequently placed within the tubular members 30. The tubular members 30 may also include various decorative patterns.

The tubular members 30 are generally comprised of cylindrically formed sidewalls 31 to define a channel 35 within and substantially hollow structured tubular member 30. The tubular members 30 each include an upper opening 34 extending through a first end of the tubular members 30 and a closed bottom 32 at a second end of the tubular member 30, wherein the second end is opposite the first end. It is appreciated that only a portion of the second end of the tubular members 30 extends within the receptacles 22 and the rest of the tubular members 30 protrudes outward from the base unit 20.

A plurality of decorative objects 38 may also be positioned within the tubular members 30 to enhance the appearance of the assembly 10. The decorative objects 38 may range from figurines, chocolates, rocks, pictures lining the interior surface of the tubular member 30, or various others. The decorative objects 38 are generally used in embodiments where the vessel 40 is used to prevent the nutrient composition 15 for the flowers 12 from intermixing with the decorative objects 38.

D. Vessel.

A vessel 40, such as a test tube, capsule, or vase, is also preferably positioned within the channel 35 of the tubular member 30 through the upper opening 34. The vessel 40 is generally used to receive and retain the stems 13 of the flowers 12. The vessels 40 are generally comprised of a clear plastic or glass material so as to view within, however other materials and colors may be appreciated. The vessels 40 may also include various decorative patterns.

Each of the vessels 40 preferably includes a cap portion 41 that is positioned external to the tubular member 30 above the tubular member 30 and an elongated portion 44 extending vertically therefrom for extending internal to the tubular member 30 within the channel 35. The cap portion 41 generally is comprised of a larger diameter than the elongated portion 44, wherein the elongated portion 44 is suspended via the cap portion 41.

The cap portion 41 also includes an opening 42 extending therethrough for receiving the stems 13 of the flowers 12. The opening 42 leads to a compartment 45 extending within the elongated portion 44. The compartment 45 is sealed on a lower end so that nutrient composition 15 including soil, fertilizer, water, and other plant nutrients may be positioned within the compartment 45 along the stems 13 of the flowers 12.

E. Retainer Ring.

A retainer ring 50 is used to secure the vessel 40 to the first end and within the upper opening 34 and channel 35 of the tubular member 30. The retainer rings 50 are generally comprised of a circular structure to attach to the vessels 40 and tubular members 30. The retainer rings 50 may be comprised of various materials, such as but not limited to plastic.

The retainer ring 50 generally includes a top 51 including an opening 52 extending concentrically therethrough for receiving the elongated portion 44 of the vessel 40. It is appreciated that the elongated portion 44 of the vessel 40 is able to extend through the opening 52 of the top 51 of the retainer ring 50 and the cap portion 41 is not able to extend through the opening 52 so that the cap portion 41 may rest upon the top 51 of the retainer ring 50 and the elongated portion 44 is suspended below.

The retainer ring 50 also includes a rim 54 extending vertically downward from the circumference of the top 51 for being positioned around the external surface of the first end of the tubular member 30. The rim 54 may be secured to the first end of the tubular member 30 in various manners, such as frictionally, via gravity, or various other manners.

F. Operation of Preferred Embodiment.

In use, the base is positioned upon a supporting surface and the tubular members 30 are slid within the receptacles 22. As the tubular members 30 slide within the receptacles 22, the grip members 23 frictionally engage the exterior surface of the tubular members 30 to snugly retain the tubular members 30 within the receptacles 22. If using the vessels 40, various types of decorative objects 38 may also be positioned within the tubular members 30. If not using the vessels 40, the decorative flowers 12 may be placed direction within the tubular members 30 and nutrient composition 15 may also be positioned within the tubular members 30. It is appreciated that the decorative flowers 12 may be arranged in various manners, such as different flowers 12 within each tubular member 30 or various other arrangements.

If using the vessels 40, the stem 13 of the flowers 12 and nutrient composition 15 are placed within the compartment 45 of the vessels 40. The elongated portion 44 of the vessel 40 is then extended through the opening 52 of the retainer ring 50 until the cap portion 41 engages the top 51 of the retainer ring 50 with the rim 54 extending vertically downward. The elongated portion 44 of the vessel 40 is now extended through the upper opening 34 of the tubular member 30 within the channel 35 and the retainer ring 50 is connected to the first end of the tubular member 30 so as to retain the vessel 40 and flowers 12 in an upright manner concentric with the respective tubular member 30.

The light(s) 26 may also be illuminated to illuminate the tubular member 30, vessel 40, and flowers 12 as appreciated. The assembly 10 may also be used without the base unit 20, such as to sell, display, or arrange, various assemblies of tubular members 30, vessels 40, retainer rings 50, and flowers 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A floral arrangement assembly, comprising:
   a base unit having a plurality of receptacles;
   a plurality of tubular members removably positioned within said plurality of receptacles;
   wherein said plurality of tubular members are retained within said plurality of receptacles in a substantially upright manner;
   a plurality of vessels positioned within said plurality of tubular members;
   wherein said plurality of vessels are adapted to receive and retain a plurality of decorative flowers; and
   a plurality of retainers for securing said plurality of vessels to said plurality of tubular members;
   wherein said plurality of retainers are each comprised of a ring structure.

2. The floral arrangement assembly of claim 1, wherein at least a portion of said plurality of receptacles are arranged in a circular arrangement.

3. The floral arrangement assembly of claim 1, wherein said plurality of receptacles each include a plurality of grip members protruding internally.

4. The floral arrangement assembly of claim 1, wherein said base unit is comprised of a dome shaped structure.

5. The floral arrangement assembly of claim 1, wherein said plurality of vessels each include an elongated portion positioned internal to said plurality of tubular members and a cap portion positioned external to said plurality of tubular members.

6. The floral arrangement assembly of claim 1, wherein said plurality of retainers each include a vertically extending rim for engaging an exterior surface of said plurality of tubular members.

7. The floral arrangement assembly of claim 1, including a plurality of decorative objects positioned within said plurality of tubular members below said plurality of vessels.

8. The floral arrangement assembly of claim 1, including at least one light positioned within said base.

9. The floral arrangement assembly of claim 1, including a plurality of lights positioned within said base, wherein one of said plurality of lights are positioned below each of said plurality of receptacles.

10. A floral arrangement assembly, comprising:
    a tubular member comprised of a substantially hollow structure;
    a plurality of decorative objects positioned within said tubular member;
    wherein said tubular member includes an opening at a first end and a closed bottom at a second end;
    a vessel positioned at least partially within said opening of said tubular member;
    wherein said vessel is adapted to receive and retain at least one decorative flower; and
    a retainer ring for securing said vessel to said first end of said tubular member.

11. The floral arrangement assembly of claim 10, wherein said vessel includes an elongated portion positioned internal to said tubular member and a cap portion positioned external to said tubular member.

12. A floral arrangement assembly, comprising:
    a base unit having a plurality of receptacles, wherein said base unit is comprised of a dome shaped structure;
    at least one light positioned within said base; and
    a plurality of tubular members comprised of a substantially hollow structure and removably positioned within said plurality of receptacles;
    wherein said plurality of tubular members each include an opening at a first end and a closed bottom at a second end;
    wherein said plurality of tubular members are retained within said plurality of receptacles in a substantially upright manner;
    wherein said plurality of tubular members are adapted to receive and retain a plurality of decorative flowers through said opening.

13. The floral arrangement assembly of claim 12, wherein at least a portion of said plurality of receptacles are arranged in a circular arrangement.

14. The floral arrangement assembly of claim 12, wherein said plurality of receptacles each include a plurality of grip members protruding internally.

15. The floral arrangement assembly of claim 12, wherein said at least one light is comprised of a plurality of lights positioned within said base, wherein one of said plurality of lights are positioned below each of said plurality of receptacles.

* * * * *